(12) United States Patent
Wada

(10) Patent No.: US 8,842,165 B2
(45) Date of Patent: Sep. 23, 2014

(54) STEREOSCOPIC IMAGE PICKUP APPARATUS AND STEREOSCOPIC IMAGE PICKUP METHOD

(75) Inventor: Noriaki Wada, Hyogo (JP)

(73) Assignee: Panasonic Corporation, Osaka (JP)

( * ) Notice: Subject to any disclaimer, the term of this patent is extended or adjusted under 35 U.S.C. 154(b) by 434 days.

(21) Appl. No.: 13/020,922

(22) Filed: Feb. 4, 2011

(65) Prior Publication Data

US 2012/0086782 A1    Apr. 12, 2012

(30) Foreign Application Priority Data

Oct. 8, 2010 (JP) .................................. 2010-228292

(51) Int. Cl.
*H04N 13/02*    (2006.01)

(52) U.S. Cl.
CPC ...... *H04N 13/0239* (2013.01); *H04N 2213/002* (2013.01); *H04N 13/0296* (2013.01)
USPC ........................................................... 348/47

(58) Field of Classification Search
USPC ........... 348/42, 43, 44, 222.1, 240.3; 382/154
See application file for complete search history.

(56) References Cited

U.S. PATENT DOCUMENTS

| | | | | |
|---|---|---|---|---|
| 4,999,713 A | * | 3/1991 | Ueno et al. ................. | 348/240.3 |
| 5,673,081 A | * | 9/1997 | Yamashita et al. ............. | 348/42 |
| 6,549,650 B1 | * | 4/2003 | Ishikawa et al. .............. | 382/154 |
| 2009/0273688 A1 | * | 11/2009 | Nonaka et al. ............. | 348/222.1 |
| 2011/0234767 A1 | | 9/2011 | Tokiwa | |

FOREIGN PATENT DOCUMENTS

| | | |
|---|---|---|
| JP | 09-215012 | 8/1997 |
| JP | 10-051812 | 2/1998 |
| JP | 2010-81010 | 4/2010 |
| JP | 2010-103895 | 5/2010 |
| JP | 2011-211381 | 10/2011 |

* cited by examiner

*Primary Examiner* — Tung Vo
*Assistant Examiner* — Rowina Cattungal
(74) *Attorney, Agent, or Firm* — Panasonic Patent Center

(57) ABSTRACT

A stereoscopic image pickup apparatus includes a first imaging section, a second imaging section, a zoom controller, and an image selection section. The first imaging section includes a zoom lens. The second imaging section includes a zoom lens. The zoom controller controls angles of view of the zoom lenses of the first imaging section and the second imaging section. The image selection section outputs image signals, which are output by the first imaging section and the second imaging section, as image signals of two channels constituting a stereoscopic image when the angles of view controlled by the zoom controller are equal to or greater than a predetermined value. In addition, the image selection section outputs image signals, which are based on the image signal output by either the first imaging section or the second imaging section, as the image signals of two channels constituting the stereoscopic image when the angles of view controlled by the zoom controller are less than the predetermined value.

6 Claims, 5 Drawing Sheets

STEREOSCOPIC IMAGE PICKUP APPARATUS AND STEREOSCOPIC IMAGE PICKUP METHOD

CROSS-REFERENCE TO RELATED APPLICATIONS

This application claims priority to Japanese Patent Application No. 2010-228292 filed on Oct. 8, 2010. The entire disclosure of Japanese Patent Application No. 2010-228292 is hereby incorporated herein by reference.

BACKGROUND

1. Technical Field

The technical field relates to a stereoscopic image pickup apparatus that takes a stereoscopic image by using two imaging sections. In particular, the technical field relates to a stereoscopic image pickup apparatus capable of preventing excessive parallax from occurring at the time of shooting a telephoto image with a zoom lens.

2. Background Information

In recent years, attention has been focused on image pickup apparatuses that independently shoot a left-eye image and a right-eye image in a synchronous manner so as to obtain a stereoscopic image (a 3D image). There have been proposed various display devices and methods for viewing the stereoscopic image. All of them are based on the basic principle that three dimensions are provided by using binocular disparity. In many cases, the stereoscopic image pickup apparatuses control the convergence angle, which is an angle formed between optical axes of two imaging sections intersecting with each other. Japanese Laid-Open Patent Application 2010-103895 discloses an image pickup apparatus having a camera shake prevention section for preventing the effect caused by shaking of the hands unintentionally in an image which is taken by changing an optical path from the photographic lens to the image pickup device in accordance with the shaking detected for each of plural imaging sections. The image pickup apparatus sequentially takes images while changing the convergence angle by controlling the camera shake prevention section for each imaging sections. In such a manner, it is possible to acquire plural images for which the convergence angles are different, and thus it is possible to select a stereoscopic image which is desired by a user.

There is a problem in that, when viewing the stereoscopic image taken by the stereoscopic image pickup apparatus, a person feels discomfort if the parallax is too large. The reason is that, regarding the stereoscopic image for which the parallax is too large, the person's brain is unable to unite the images into a stereoscopic image. In order to avoid this problem, on the set, a photographer shoots by adjusting the convergence angle, the angle of view, the object distance, and the like so as not to create a large parallax.

SUMMARY

Since a stereoscopic image with large parallax is recognized as an unpleasant image, it is necessary to set the parallax in an appropriate range by adjusting the convergence angle, the angle of view, and the like. However, when the angle of view is set to be small, that is, when the zoom lens is used on the telephoto side, there is a problem in that large parallax is caused by the slight difference in the distance to the object. That is, when the zoom lens is used in the telephoto mode, there is a problem in that it is difficult to set the parallax in an appropriate range.

In view of the above concerns, a stereoscopic image pickup apparatus is provided which is capable of controlling the zoom lens within the comfortable parallax range even when the zoom lens is used in the telephoto mode.

In order to solve the above-mentioned problems, according to an embodiment, a stereoscopic image pickup apparatus includes two imaging sections: a first imaging section that includes a zoom lens; and a second imaging section that includes a zoom lens. The stereoscopic image pickup apparatus further includes: a zoom controller that controls the angles of view of the zoom lenses of the first imaging section and the second imaging section; and an image selection section that outputs image signals, which are output by the first imaging section and the second imaging section, as image signals of the two channels when the angles of view controlled by the zoom controller are equal to or greater than a predetermined value, and outputs image signals, which are based on the image signal output by either the first imaging section or the second imaging section, as the image signals of two channels when the angles of view controlled by the zoom controller are less than the predetermined value.

DETAILED DESCRIPTION OF THE EMBODIMENTS

Hereinafter, stereoscopic image pickup apparatuses according to embodiments will be described with reference to the accompanying drawings.

First, description will be given of a principle that a large parallax is caused by the slight difference in the distance to the object when the zoom lens is used in the telephoto mode.

Regarding stereoscopic images using binocular disparity, guidelines for video producers are described in "3DC Safety Guidelines for the Spread of 3D Comfortable for Humans" published by 3D Consortium, revised Apr. 20, 2010. According to the description in the guidelines, when a high-definition TV with the aspect ratio of 16:9 is viewed at a visual distance equal to three times the screen height, the comfortable parallax range is equal to or less than 2.9% of the screen width. That is, the negative parallax is 2.9% or less of the screen width, and thus it is necessary for the positive parallax to be 2.9% or less of the screen width.

Figure 3:
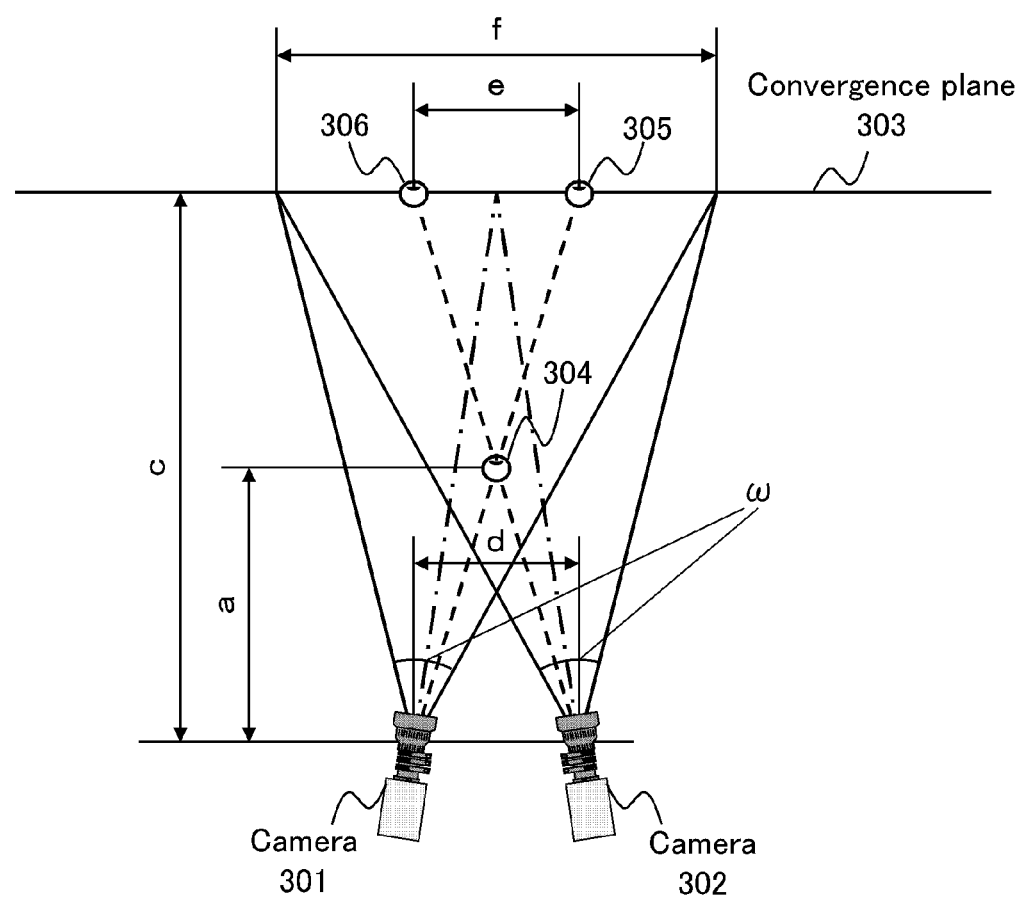
FIG. 3 is an explanatory diagram illustrating negative parallax.

FIG. 3 is a diagram illustrating negative parallax. In FIG. 3, the convergence plane 303 is defined as the plane on which convergence can be set as a distance at which the optical axes of the camera 301 and the camera 302 of a binocular camera intersect with each other. The distance a is defined as the nearest point distance at which the object is located nearest to the camera 301 and camera 302 within the comfortable parallax range, which is the parallax range equal to or less than 2.9% of the screen width. The distance c is defined as a convergence plane distance. The distance d is defined as an inter-axial distance between the camera 301 and the camera 302. The angle ω is defined as a horizontal angle of view of the camera 301 and the camera 302 (the angles of the camera 301 and the camera 302 are the same). Here, the point 305 and the point 306 are defined as points at which the convergence plane 303 intersects with the straight lines respectively connecting the object 304 to the camera 301 and the camera 302 when the camera 301 and the camera 302 take images of an object 304 at the nearest point. The distance e between the two points is defined as the parallax of a stereoscopic image. On the other hand, in the imaging range of the horizontal angle of view ω, the distance f on the convergence plane 303 corresponds to the screen width at the time of image display, and thus the negative parallax is set to 2.9% of the screen width, which means that e÷f is set to be equal to 2.9%.

$$e \div f = 0.029 \quad \text{(Equation 1)}$$

Here, assuming that the convergence plane distance c is excessively larger than the distance d, the above equation can be rewritten as the following equation.

$$f \approx 2 \times c \times \tan\frac{\omega}{2} \quad \text{(Equation 2)}$$

Further, from the relationship between two similar triangles, the following equation can be obtained.

$$e : c - a = d : a \quad \text{(Equation 3)}$$

Therefore, $$e = \frac{d(c-a)}{a} \quad \text{(Equation 4)}$$

Accordingly, from Equations 1, 2, and 4, the following equation can be obtained.

$$0.029 = \frac{d(c-a)}{a} \times \frac{1}{2 \times c \times \tan\frac{\omega}{2}} \quad \text{(Equation 5)}$$

That is, $$a = \frac{d \times c}{d + 0.058 \times c \times \tan\frac{\omega}{2}} \quad \text{(Equation 6)}$$

Accordingly, the nearest point distance a can be calculated from the convergence plane distance c, the distance d, and the horizontal angle of view ω.

Figure 4:
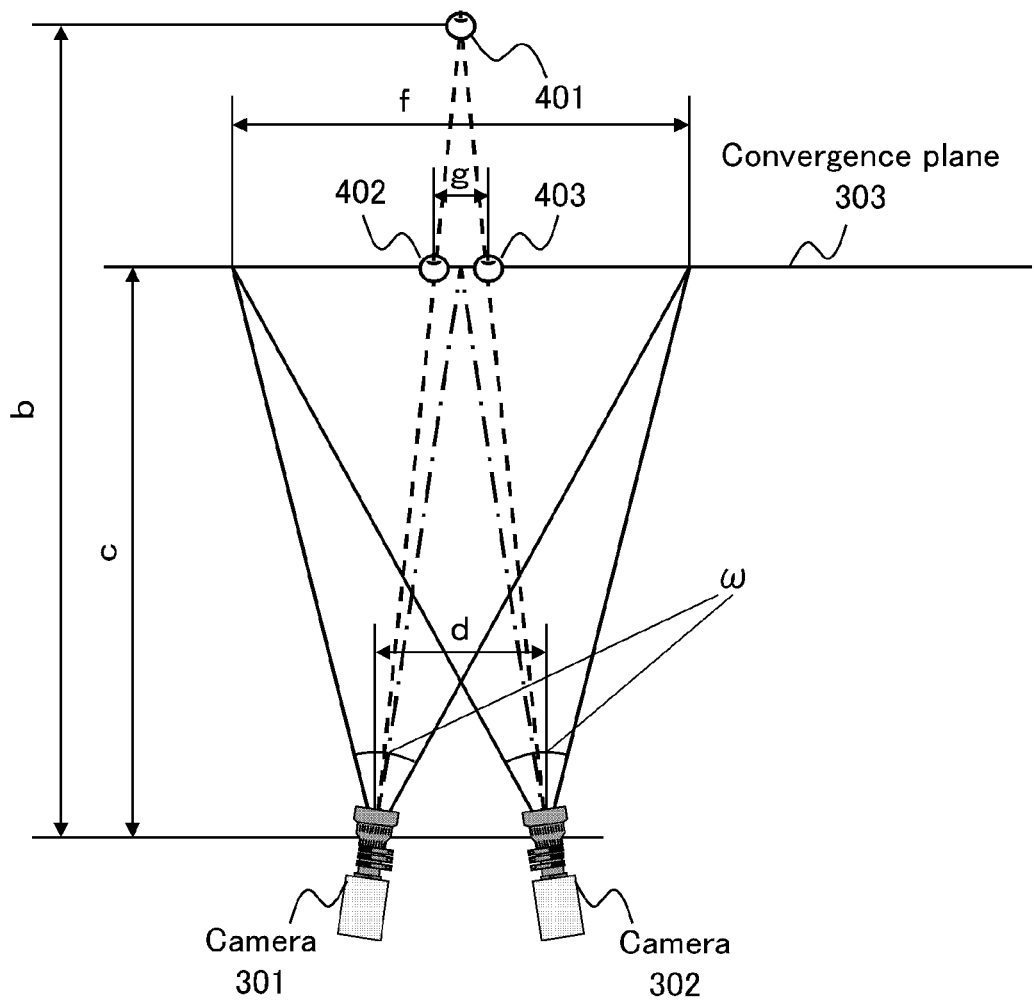
FIG. 4 is an explanatory diagram illustrating positive parallax.

FIG. 4 is a diagram illustrating positive parallax. In FIG. 4, similarly to FIG. 3, the convergence plane 303 is defined as the plane on which the convergence can be set as the distance at which the optical axes of the camera 301 and the camera 302 of a binocular camera intersect with each other. The distance b is defined as the farthest point distance at which the object is located farthest from the camera 301 and camera 302 within the comfortable parallax range as a parallax range equal to or less than 2.9% of the screen width. The distance c is defined as the convergence plane distance. The distance d is defined as an inter-axial distance between the camera 301 and the camera 302. The angle ω is defined as the horizontal angle of view of the camera 301 and the camera 302 (the angles of the camera 301 and the camera 302 are the same). Here, the point 402 and the point 403 are defined as points at which the convergence plane 303 intersects with the straight lines respectively connecting the object 401 to the camera 301 and the camera 302 when the camera 301 and the camera 302 take images of an object 401 at the farthest point. The distance g between the two points is defined as the parallax of the stereoscopic image. On the other hand, in the imaging range of the horizontal angle of view ω, the distance f on the convergence plane 303 corresponds to the screen width at the time of image display, and thus the positive parallax is set to 2.9% of the screen width, which means that g÷f is set to be equal to 2.9%.

$$g \div f = 0.029 \quad \text{(Equation 7)}$$

Here, assuming that the convergence plane distance c is excessively larger than the distance d, in the same manner as in FIG. 3, the above equation can be rewritten as the following equation.

$$f \approx 2 \times c \times \tan\frac{\omega}{2} \quad \text{(Equation 8)}$$

Further, from the relationship between two similar triangles, the following equation can be obtained.

$$b - c : g = b : d \quad \text{(Equation 9)}$$

Therefore, $$g = \frac{d(b-c)}{(b)} \quad \text{(Equation 10)}$$

Accordingly, from Equations 7, 2, and 9, the following equation can be obtained.

$$0.029 = \frac{d(b-c)}{b} \times \frac{1}{2 \times c \times \tan\frac{\omega}{2}} \quad \text{(Equation 11)}$$

That is, $$b = \frac{d \times c}{d - 0.058 \times c \times \tan\frac{\omega}{2}} \quad \text{(Equation 12)}$$

Accordingly, the farthest point distance b can be calculated from the convergence plane distance c, the distance d, and the horizontal angle of view ω.

Here, focusing on Equations 6 and 11, it is assumed that the zoom lens is on the telephoto side, that is, the horizontal angle of view ω is set to be small. When the horizontal angle of view ω is set to be small, the value of a increases, and the value of b decreases. For example, when c=7.00 m, d=0.065 m, and ω is set in the range of 2° to 12°, a=4.2 m and b=20.4 m at ω=12°, while a=6.3 m and b=7.9 m at ω=2°. As described above, when the horizontal angle of view ω is set to be small, the value of a increases, and the value of b decreases. The object distance range for achieving comfortable parallax is changed from a range of 4.2 m to 20.4 m at ω=12° to a range of 6.3 m to 7.9 m at ω=2° by setting the zoom lens to telephoto mode. Therefore, the distance range decreases. When the horizontal angle of view ω is set to be smaller, the object distance range for achieving the comfortable parallax further decreases. The decrease in the object distance range for achieving the comfortable parallax means that large parallax is caused by the slight distance difference and thus excessive parallax tends to occur at the time of taking a stereoscopic image in practice. For example, although the parallax is set in the comfortable parallax range by adjusting the convergence plane to the target object, when the landscape behind the target object is shot or another object in front of the target object is shot, it can be expected that the parallax exceeds the comfortable parallax range.

As described above, when the zoom lens is used in the telephoto mode, it is difficult to set the parallax in an appropriate range. Hereinafter, referring to the following embodiments, description will be given of the stereoscopic image pickup apparatus for controlling the zoom lens within the comfortable parallax range even when the zoom lens is used in the telephoto mode.

First Embodiment

1. Configuration of Stereoscopic Image Pickup Apparatus

Figure 1:
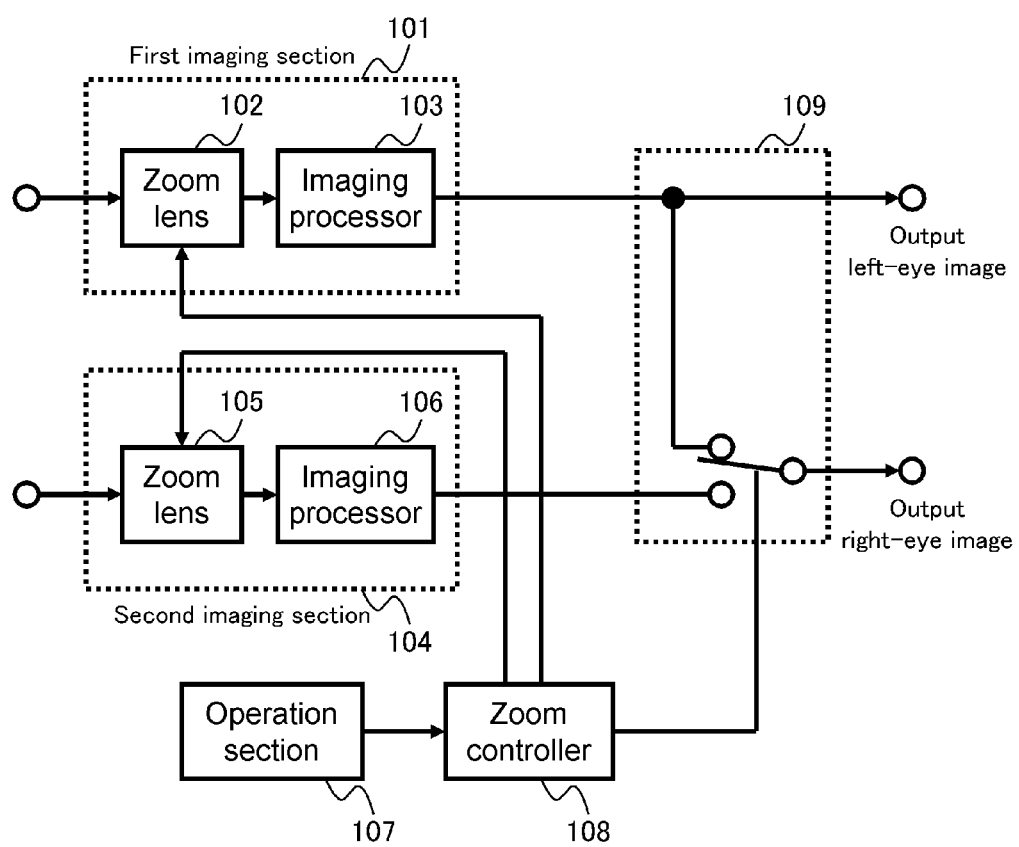
FIG. 1 is a block diagram illustrating a configuration of a stereoscopic image pickup apparatus according to a first embodiment.

FIG. 1 is a block diagram illustrating a configuration of the stereoscopic image pickup apparatus according to a first embodiment. In FIG. 1, the stereoscopic image pickup apparatus includes a first imaging section 101, a second imaging section 104, an operation section 107, a zoom controller 108, and an image selection section 109.

The first imaging section 101 and the second imaging section 104 are disposed with a predetermined inter-axial. The predetermined inter-axial is frequently set to about 65 mm which is the space between both eyes of the average adult, but is not limited to this space. The first imaging section 101 is disposed on the left side of the apparatus in order to take a left-eye image, and the second imaging section 104 is disposed on the right side in order to take a right-eye image. The first imaging section 101 has a zoom lens 102 and an imaging processor 103. The first imaging section 101 focuses optical input through the zoom lens 102 and takes an image thereof through the imaging processor 103, thereby outputting an image signal. Likewise, the second imaging section 104 also has a zoom lens 105 and an imaging processor 106. The second imaging section 104 focuses an optical input through the zoom lens 105 and takes an image thereof through the imaging processor 106, thereby outputting an image signal.

The operation section 107 has a lever for zooming the zoom lens 102 and the zoom lens 105 toward the wide angle side or the telephoto side. This lever operation using the operation section 107 is converted into an electric signal, and is output to the zoom controller 108.

The zoom controller 108 controls the angle of view of the zoom lens 102 and the zoom lens 105 in response to the electric signal which is input from the operation section 107. For example, the zoom controller 108 outputs a voltage of 0V to the zoom lens 102 and the zoom lens 105 at the maximum angle of view which is a horizontal angle of view of 45°, and outputs a voltage of 3V at the minimum angle of view which is a horizontal angle of view of 2°. The zoom controller 108 controls the angle of view by outputting a voltage ranging from 0V to 3V. On the other hand, the zoom controller 108 outputs an image selection signal to the image selection section 109. Specifically, the image selection signal becomes '0' when the zoom lens 102 and the zoom lens 105 are on the wide angle side, and becomes '1' when they are on the telephoto side. Further, the image selection signal becomes '0' at the horizontal angle of view of 8° or more and 45° or less, and becomes '1' at the horizontal angle of view of 2° or more and less than 8°.

The image selection section 109 switches an output signal in response to the image selection signal which is transmitted from the zoom controller 108. Specifically, when the image selection signal transmitted from the zoom controller 108 is '0', the image selection section 109 outputs the image signal, which is output by the first imaging section 101, as a left-eye image, and outputs the image signal, which is output by the second imaging section 104, as a right-eye image. Further, when the image selection signal transmitted from the zoom controller 108 is '1', the image selection section 109 outputs the same images as the left-eye image and the right-eye image on the basis of the image signal which is output by the first imaging section 101.

2. Operations of Stereoscopic Image Pickup Apparatus

Operations for the zooming of the stereoscopic image pickup apparatus according to the first embodiment will be described with reference to the flowchart of FIG. 5.

A photographer turns on the power of the apparatus, and then the stereoscopic image pickup apparatus is activated. At the time of the activation, the zoom controller 108 reads out angle-of-view information stored in a non-volatile memory which is not shown in the block diagram of FIG. 1 (S110). As described later, the angle-of-view information, which is obtained when the power is turned off right before the power is turned on, is stored.

Next, the zoom controller 108 determines whether the horizontal angle of view is equal to or greater than 8° on the basis of the angle-of-view information (S120). If the horizontal angle of view is equal to or greater than 8° (Yes in S120), the zoom controller 108 outputs the image selection signal of '0' (S130). On the basis of the image selection signal of '0' transmitted from the zoom controller 108, the image selection section 109 selects the image signal, which is output by the first imaging section 101, as the left-eye image output, and selects the image signal, which is output by the second imaging section 104, as the right-eye image output. If the horizontal angle of view is less than 8° (No in S120), the zoom controller 108 outputs the image selection signal of '1' (S140). On the basis of the image selection signal of '1' transmitted from the zoom controller 108, the image selection section 109 selects the image signal, which is output by the first imaging section 101, as the left-eye image output, and selects the image signal, which is output by the first imaging section 101, as the right-eye image output.

Next, it is determined whether a termination process is performed by the power-off operation (S150). If the determination in S150 is 'termination', the zoom controller 108 stores the angle-of-view information in the non-volatile memory which is not shown in the block diagram of FIG. 1 (S180), and performs the termination. If the determination in S150 is 'not termination', the zoom controller 108 acquires the input which is transmitted from the operation section 107 (S160).

The zoom controller 108 compares the acquired information with the angle-of-view information which is held just before, and determines whether the angle-of-view information is changed (S170). If there is no change in the angle-of-view information, the process advances to step S150. If there is a change, which is made by the zooming operation using the operation section 107, in the angle-of-view information, the process advances to step S120. In S120, the zoom controller 108 determines whether the horizontal angle of view is equal to or greater than 8°.

As described above, the zoom controller 108 monitors the change in the angle of view caused by the zooming operation until the termination process is performed by the power-off operation after the power-on operation, and outputs a different image selection signal depending on whether the horizontal angle of view is equal to or greater than 8° or is less than 8°. The image selection section 109 switches the output signal in response to the image selection signal transmitted from the zoom controller 108. If the horizontal angle of view is equal to or greater than 8°, the image selection section 109 outputs the image of the image signal, which is output by the first imaging section 101, as the left-eye image, and outputs the image signal, which is output by the second imaging section 104, as the right-eye image. In contrast, if the horizontal angle of view is less than 8°, the image selection section 109 outputs the image signal, which is output by the first imaging section 101, as both of the left-eye image and the right-eye image.

3. Summary

The stereoscopic image pickup apparatus according to the first embodiment is a stereoscopic image pickup apparatus that outputs a stereoscopic image formed of the left-eye image and the right-eye image which are taken by the first imaging section 101 and the second imaging section 104. In the apparatus, if the horizontal angle of view of the zoom lens 102 and the zoom lens 105 is less than 8°, the image taken by the first imaging section 101 is used in both of the left-eye image and the right-eye image. With such a configuration, in the stereoscopic image pickup apparatus, even when the zoom lens 102 and the zoom lens 105 are used in the telephoto mode, a stereoscopic image without the parallax is output, and thus the excessive parallax is unlikely to occur.

Second Embodiment

Figure 2:
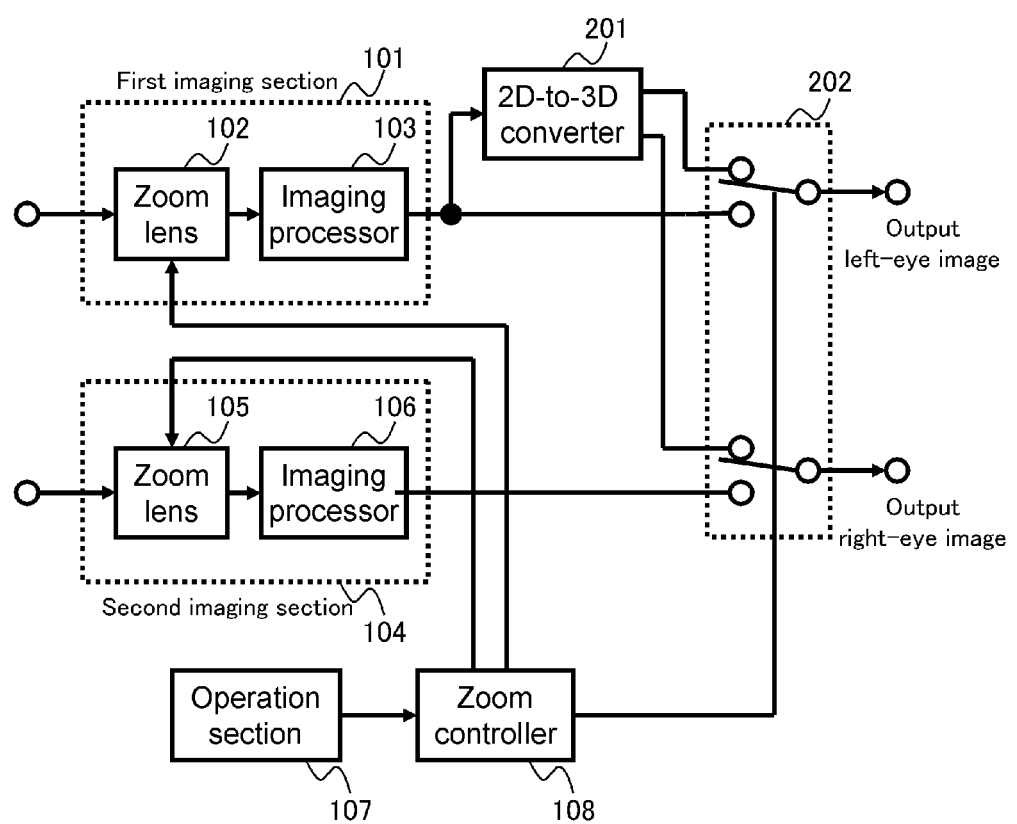
FIG. 2 is a block diagram illustrating a configuration of a stereoscopic image pickup apparatus according to a second embodiment.

FIG. 2 is a block diagram illustrating a configuration of the stereoscopic image pickup apparatus according to a second embodiment. In FIG. 2, the stereoscopic image pickup apparatus includes a first imaging section 101, a second imaging section 104, an operation section 107, a zoom controller 108, a 2D-to-3D converter 201, and an image selection section 202. If there are the same operations and the blocks having the same configurations as the first embodiment shown in FIG. 1, those will be referenced by the same reference numerals and signs, and detailed description thereof will be omitted.

The first imaging section 101, the second imaging section 104, the operation section 107, and the zoom controller 108 have the same configuration as those in the stereoscopic image pickup apparatus according to the first embodiment shown in FIG. 1.

The 2D-to-3D converter 201 generates images, of which the phases are respectively shifted rightward and leftward, from the input image signal of one of the eyes, and outputs the image signals of two channels. The phase shift is 0.2% of the screen width. The 2D-to-3D converter 201 outputs, to the image selection section 202, the image, of which the phase is shifted leftward by 0.2% thereof, as the left-eye image, and the image, of which the phase is shifted rightward by 0.2% thereof, as the right-eye image. The parallax between the left-eye image and the right-eye image caused by the phase shift is 0.4% of the screen width, and is parallax smaller than 2.9% of the screen width.

The image selection section 202 switches an output signal in response to the image selection signal which is transmitted from the zoom controller 108. Specifically, when the image selection signal transmitted from the zoom controller 108 is '0', the image selection section 202 outputs the image signal, which is output by the first imaging section 101, as the left-eye image, and outputs the image signal, which is output by the second imaging section 104, as the right-eye image. Further, when the image selection signal transmitted from the zoom controller 108 is '1', the image selection section 202 selects the left-eye image signal, which is output by the 2D-to-3D converter 201, as the left-eye image, and selects the right-eye image signal, which is output by the 2D-to-3D converter 201, as the right-eye image, thereby outputting them.

Figure 5:
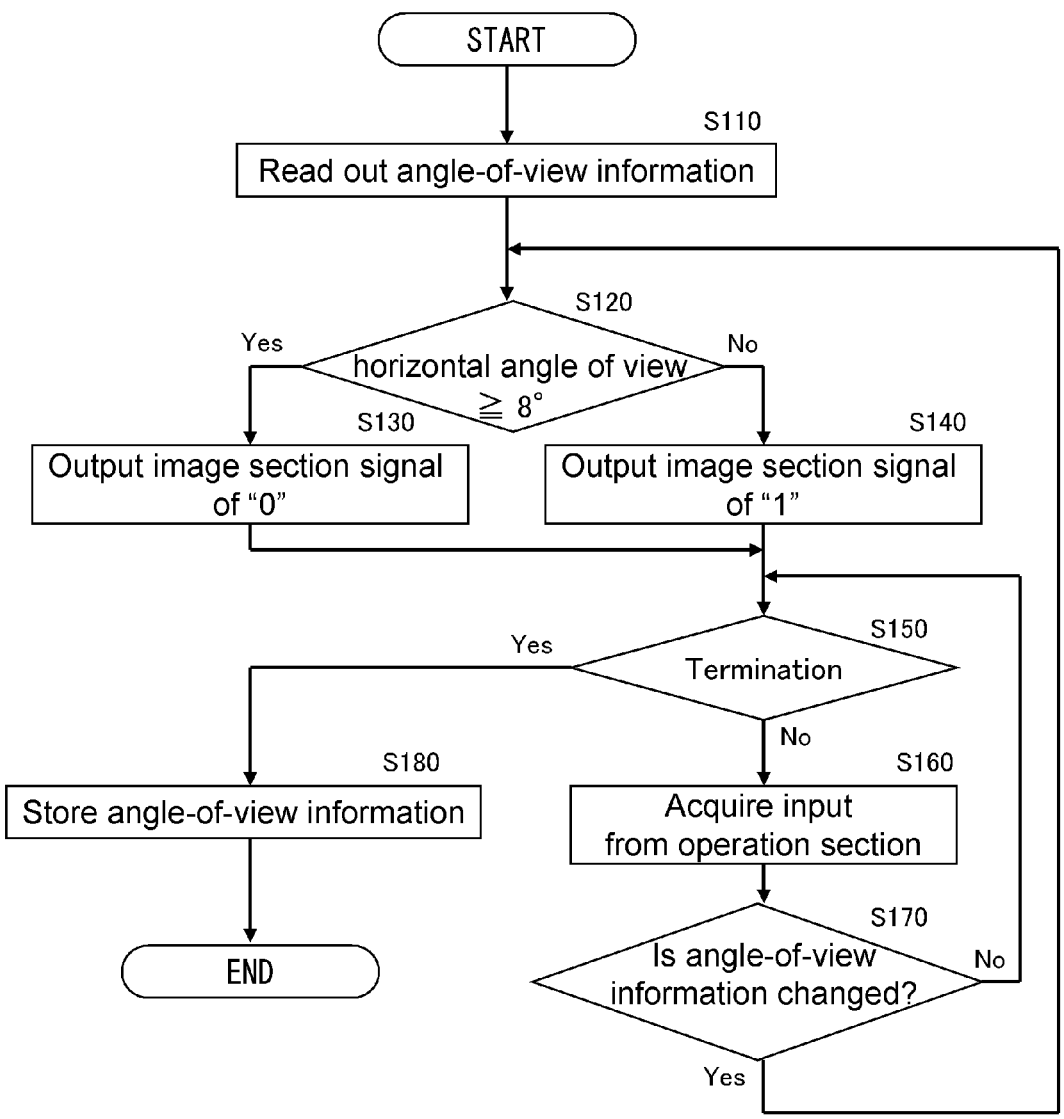
FIG. 5 is a flowchart illustrating an operation at the time of a zoom operation.

Operations for the zooming of the stereoscopic image pickup apparatus according to the second embodiment are the same as those of the stereoscopic image pickup apparatus according to the first embodiment shown in the flowchart of FIG. 5, except for some differing points. The different parts are steps S130 and S140 of the flowchart shown in FIG. 5. In S130, when the image selection signal is '0', the image selection section 202 selects the image, which is output by the first imaging section 101, as the left-eye image output, and selects the image, which is output by the second imaging section 104, as the right-eye image output. In S140, when the image selection signal is '1', the image selection section 202 selects the left-eye image, which is output by the 2D-to-3D converter 201, as the left-eye image output, and selects the right-eye image, which is output by the 2D-to-3D converter 201, as the right-eye image output.

The stereoscopic image pickup apparatus according to the second embodiment is a stereoscopic image pickup apparatus that outputs a stereoscopic image formed of the left-eye image and the right-eye image which are taken by the first imaging section 101 and the second imaging section 104. In the apparatus, if the horizontal angle of view of the zoom lens 102 and the zoom lens 105 is less than 8°, the left-eye image and right-eye image with small parallax created by the 2D-to-3D converter 201 is output. With such a configuration, even when the zoom lens 102 and the zoom lens 105 are used in the telephoto mode, the excessive parallax is unlikely to occur.

The first and second embodiments have been exemplified as embodiments of the invention. However, the invention is not limited thereto. Therefore, other embodiments of the invention will be collectively described below. It should be noted that the invention is also not limited to the other embodiments and may be applied to an appropriately modified embodiment.

In the first and second embodiments, the zoom controller 108 switches the output image selection signal at the horizontal angle of view of the zoom lens of 8° as a boundary, but may switch the image selection signal at the horizontal angle of view of 12° as a boundary. As described in Equations 6 and 11, the object distance range for achieving comfortable parallax is changed by the space of the binocular camera, that is, the space in which the first imaging section 101 and the second imaging section 104 are disposed. Hence, the horizontal angle of view set as a boundary may be changed on the basis of various design conditions.

In the first and second embodiments, the zoom controller 108 switches the output image selection signal at an 8° horizontal angle of view of the zoom lens as a boundary. However, the determination may not depend on the value of the horizontal angle of view. For example, the determination may depend on the voltage for controlling the angle of view of the zoom lens, or a digital value corresponding to the voltage.

Further, in the first and second embodiments, when the angle of view of the zoom lens 102 and the zoom lens 105 is continuously changed by the lever operation of the operation section 107, the zoom controller 108 switches the output image selection signal at the horizontal angle of view of 8° as a boundary. However, it may be possible to adopt a switchable mode configuration in which the wide angle mode may be set at a horizontal angle of view of 8° or more and the telephoto mode may be set at a horizontal angle of view of less than 8°. In this case, the zoom controller 108 keeps the image selection signal at '0' in the wide angle mode in which the horizontal angle of view is 8° or more, and keeps the image selection signal at '1' in the telephoto mode in which the horizontal angle of view is less than 8°.

In the second embodiment, the description was given of the method that the 2D-to-3D converter 201 generates the images, for which the phases are respectively shifted rightward and leftward by 0.2% of the screen width, from the input image signal of one of the eyes so as to form a parallax of 0.4%. However, the amount of the phase shift may be changed, for example, such that the parallax is set to 1% of the screen width. Further, if the parallax is within 2.9% of the screen width, other methods of converting 2D to 3D may be used.

What is claimed is:

1. A stereoscopic image pickup apparatus that captures a stereoscopic image, the stereoscopic image pickup apparatus comprising:
    a first imaging section that includes a zoom lens;
    a second imaging section that includes a zoom lens;
    a zoom controller that controls horizontal angles of view of the zoom lenses of the first imaging section and the second imaging section; and
    an image selection section that outputs image signals, which are output by the first imaging section and the second imaging section, as image signals of two channels when the horizontal angles of view controlled by the zoom controller are equal to or greater than 8°, and the image selection section outputs image signals, each of which is based on the same image signal output by one of the first imaging section or the second imaging section, as the image signals of two channels when the horizontal angles of view controlled by the zoom controller are less than 8°;
    wherein the horizontal angles of view of the zoom lenses controlled by the zoom controller range from a wide angle side and a telephoto side.

2. The stereoscopic image pickup apparatus according to claim 1,
    wherein the image selection section outputs the image signal, which is output by one of the first imaging section or the second imaging section, as the image signals of two channels when the horizontal angles of view controlled by the zoom controller is less than 8°.

3. The stereoscopic image pickup apparatus according to claim 1, further comprising a 2D-to-3D converter that creates parallax on the basis of the image signal, which is output by one of the first imaging section or the second imaging section, and converts the parallax into a 3D image so as to output the image signals of two channels,
    wherein the image selection section outputs the image signals of two channels, which are output by the 2D-to-3D converter, when the horizontal angles of view controlled by the zoom controller is less than 8°.

4. The stereoscopic image pickup apparatus according to claim 3, wherein the 2D-to-3D converter generates the image signals of two channels by shifting the phase of the image signal output by one of the first imaging section or the second imaging section rightward and leftward.

5. A stereoscopic image pickup method for a stereoscopic image pickup apparatus including a first imaging section that includes a zoom lens and a second imaging section that includes a zoom lens, the stereoscopic image pickup method comprising:
    controlling horizontal angles of view of the zoom lenses of the first imaging section and the second imaging section;
    outputting image signals, which are output by the first imaging section and the second imaging section, as image signals of two channels when the horizontal angles of view controlled by the process of controlling the angles of view are equal to or greater than 8°, and outputting image signals, each of which is based on the same image signal output by one of the first imaging section or the second imaging section, as the image signals of two channels when the horizontal angles of view controlled by the process of controlling the horizontal angles of view are less than 8°;
    wherein the horizontal angles of view of the zoom lenses which are controlled range from a wide angle side and a telephoto side.

6. The method of claim 5, wherein the outputting of the image signals which are based on the image signal output by one of the first imaging section or the second imaging section further includes shifting a phase of the image signal output by either the first imaging section or the second imaging section rightward and leftward to generate the image signals.

* * * * *